US012715985B2

(12) United States Patent
Yamamoto et al.

(10) Patent No.: US 12,715,985 B2
(45) Date of Patent: Aug. 25, 2026

(54) POLYPROPYLENE RESIN COMPOSITION

(71) Applicant: SUMITOMO CHEMICAL COMPANY, LIMITED, Tokyo (JP)

(72) Inventors: Yuya Yamamoto, Chiba (JP); Takeshi Maruyama, Chiba (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 609 days.

(21) Appl. No.: 18/003,429

(22) PCT Filed: Jun. 24, 2021

(86) PCT No.: PCT/JP2021/023964
§ 371 (c)(1),
(2) Date: Dec. 27, 2022

(87) PCT Pub. No.: WO2022/004550
PCT Pub. Date: Jan. 6, 2022

(65) Prior Publication Data

US 2023/0250265 A1 Aug. 10, 2023

(30) Foreign Application Priority Data

Jun. 30, 2020 (JP) ................................ 2020-113094

(51) Int. Cl.

| | |
|---|---|
| ***C08L 23/12*** | (2006.01) |
| ***C08K 5/20*** | (2006.01) |
| ***C08K 7/14*** | (2006.01) |
| ***C08L 23/0807*** | (2025.01) |
| ***C08L 23/16*** | (2006.01) |
| ***C08L 23/26*** | (2025.01) |

(52) U.S. Cl.
CPC ................ *C08L 23/12* (2013.01); *C08K 5/20* (2013.01); *C08K 7/14* (2013.01); *C08L 23/0815* (2013.01); *C08L 23/16* (2013.01); *C08L 23/26* (2013.01); *C08L 2203/30* (2013.01); *C08L 2205/025* (2013.01); *C08L 2205/035* (2013.01); *C08L 2207/02* (2013.01)

(58) Field of Classification Search
CPC .......... C08L 23/10; C08L 23/12; C08L 23/14; C08L 23/142; C08L 23/45; C08L 23/147; C08L 23/08; C08L 23/0815; C08L 23/0823; C08K 7/14
See application file for complete search history.

(56) References Cited

U.S. PATENT DOCUMENTS

| | | | |
|---|---|---|---|
| 2009/0105397 | A1 | 4/2009 | Van Riel et al. |
| 2009/0105404 | A1 | 4/2009 | van Riel et al. |
| 2013/0012608 | A1 | 1/2013 | van Riel et al. |
| 2014/0242335 | A1 | 8/2014 | Kondo et al. |
| 2016/0046799 | A1 | 2/2016 | Van Riel et al. |
| 2019/0315955 | A1 | 10/2019 | Valkier et al. |
| 2020/0002518 | A1 | 1/2020 | Hrachova et al. |

FOREIGN PATENT DOCUMENTS

| | | | | |
|---|---|---|---|---|
| CN | 107903490 | A | 4/2018 | |
| EP | 1357144 | A1 * | 10/2003 | ............ C08L 23/142 |
| EP | 3395882 | A2 * | 10/2018 | .............. C08L 23/12 |
| JP | 2005089706 | A | 4/2005 | |
| JP | 2011256247 | A | 12/2011 | |
| JP | 2013163703 | A | 8/2013 | |
| JP | 2018172467 | A | 11/2018 | |
| KR | 20190064875 | A | 6/2019 | |
| WO | WO-2019030139 | A1 * | 2/2019 | .............. C08L 23/12 |

OTHER PUBLICATIONS

International Search Report and Written Opinion in PCT/JP2021/023964. Mailed Aug. 17, 2021. 9 pages.

* cited by examiner

*Primary Examiner* — Jeffrey S Lenihan
(74) *Attorney, Agent, or Firm* — Meunier Carlin & Curfman LLC

(57) ABSTRACT

A polypropylene resin composition which contains: from 20% by weight to 50% by weight of a heterophasic propylene polymerization material (A) that has a melt flow rate of from 70 g/10 minutes to 300 g/10 minutes as determined at 230° C. under a load of 2.16 kgf in accordance with JIS-K-6758; from 15% by weight to 40% by weight of an ethylene/α-olefin copolymer (B-1) that has a melt flow rate of from 2 g/10 minutes to 100 g/10 minutes as determined at 190° C. under a load of 2.16 kgf in accordance with JIS-K-7210; from 10% by weight to 20% by weight of an ethylene/α-olefin copolymer (B-2) that has a melt flow rate of 1 g/10 minutes or less as determined at 190° C. under a load of 2.16 kgf in accordance with JIS-K-7210; from 20% by weight to 40% by weight of glass fibers (C); and from 0.1% by weight to 5% by weight of an acid-modified polyolefin (D).

11 Claims, No Drawings

POLYPROPYLENE RESIN COMPOSITION

TECHNICAL FIELD

The present invention relates to a polypropylene resin composition.

BACKGROUND ART

Molded bodies formed by molding polypropylene resin compositions have been used in various applications including automotive interior materials, such as instrument panels, and home appliance materials. These applications require, for example, impact resistance and scratch resistance. For example, Patent Document 1 describes, as a molding composition having high impact resistance and high scratch resistance, a polymer composition including: a first polymer component containing a relatively hard thermoplastic resin; a second polymer component; and a reinforcing material.

PRIOR ART DOCUMENT

Patent Document

Patent Document 1: Japanese Translation of PCT International Application No. 2011-500946

SUMMARY OF THE INVENTION

Problems to be Solved by the Invention

However, the polymer composition described in Patent Document 1 has poor impact strength and causes warpage of molded bodies.

In such a circumstance, an object of the present invention is to provide a polypropylene resin composition that can form a molded body having high impact strength and less warpage while maintaining high scratch resistance of the molded body.

Means for Solving the Problems

The inventors of the present invention have completed the present invention as a result of intensive studies in light of such a background.

Specifically, the present invention is as described below.

[1]

A polypropylene resin composition including:

20% by weight or more and 50% by weight or less of a heterophasic propylene polymer material (A) having a melt flow rate of 70 g/10 min or higher and 300 g/10 min or lower as determined at 230° C. under a load of 2.16 kgf in accordance with JIS-K-6758;

15% by weight or more and 40% by weight or less of an ethylene-α-olefin copolymer (B-1) having a melt flow rate of 2 g/10 min or higher and 100 g/10 min or lower as determined at 190° C. under a load of 2.16 kgf in accordance with JIS-K-7210;

10% by weight or more and 20% by weight or less of an ethylene-α-olefin copolymer (B-2) having a melt flow rate of 1 g/10 min or less as determined at 190° C. under a load of 2.16 kgf in accordance with JIS-K-7210;

20% by weight or more and 40% by weight or less of a glass fiber (C); and 0.1% by weight or more and 5% by weight or less of an acid-modified polyolefin (D) (provided that the total amount of the (A), (B-1), (B-2), (C), and (D) is 100% by weight).

The following [2] to [9] are preferred aspects or embodiments of the present invention.

[2]

The polypropylene resin composition according to [1], further including a lubricant (F).

[3]

The polypropylene resin composition according to [2], wherein the lubricant (F) includes a fatty acid amide (F-1).

[4]

The polypropylene resin composition according to [3], wherein the content of the fatty acid amide (F-1) is 0.1% by weight or more and 1.0% by weight or less (provided that the total amount of the (A), (B-1), (B-2), (C), and (D) is 100% by weight).

[5]

The polypropylene resin composition according to any one of [2] to [4], wherein the lubricant (F) includes a silicone lubricant (F-2).

[6]

The polypropylene resin composition according to [5], wherein the content of the silicone lubricant (F-2) is 0.5% by weight or more and 3.0% by weight or less (provided that the total amount of the (A), (B-1), (B-2), (C), and (D) is 100% by weight).

[7]

The polypropylene resin composition according to any one of [1] to [6], further including a nucleating agent (E).

[8]

The polypropylene resin composition according to [7], wherein the content of the nucleating agent (E) is 0.01% by weight or more and 0.5% by weight or less (provided that the total amount of the (A), (B-1), (B-2), (C), and (D) is 100% by weight).

[9]

A molded body including the polypropylene resin composition according to any one of [1] to [8].

Effect of the Invention

The present invention can provide a polypropylene resin composition that can form a molded body having high impact strength and less warpage while maintaining high scratch resistance.

MODE FOR CARRYING OUT THE INVENTION

A polypropylene resin composition according to the present invention includes:

20% by weight or more and 50% by weight or less of a heterophasic propylene polymer material (A) having a melt flow rate of 70 g/10 min or higher and 300 g/10 min or lower as determined at 230° C. under a load of 2.16 kgf in accordance with JIS-K-6758;

15% by weight or more and 40% by weight or less of an ethylene-α-olefin copolymer (B-1) having a melt flow rate of 2 g/10 min or higher and 100 g/10 min or lower as determined at 190° C. under a load of 2.16 kgf in accordance with JIS-K-7210;

10% by weight or more and 20% by weight or less of an ethylene-α-olefin copolymer (B-2) having a melt flow rate of 1 g/10 min or less as determined at 190° C. under a load of 2.16 kgf in accordance with JIS-K-7210;

20% by weight or more and 40% by weight or less of a glass fiber (C); and 0.1% by weight or more and 5% by weight or less of an acid-modified polyolefin (D) (provided that the total amount of the (A), (B-1), (B-2), (C), and (D) is 100% by weight).

Heterophasic Propylene Polymer Material (A)

The polypropylene resin composition contains the heterophasic propylene polymer material (A).

The heterophasic propylene polymer material (A) can be produced through, for example, a first polymerization step for forming a polymer (I) and a second polymerization step for forming a polymer (II). Examples of the polymerization catalyst, the polymerization method, and the type of polymerization in these polymerization steps are the same as those described above.

For example, the polymer (I) may be a propylene homopolymer or may include a monomer unit derived from a monomer other than propylene. When the polymer (I) includes a monomer unit derived from a monomer other than propylene, the content of the monomer unit may be, for example, 0.01% by mass or more and less than 20% by mass based on the total mass of the polymer (I).

Examples of the monomer other than propylene include ethylene and C4 or higher α-olefins. In particular, the monomer other than propylene is preferably at least one selected from the group consisting of ethylene and C4-C10 α-olefins, more preferably at least one selected from the group consisting of ethylene, 1-butene, 1-hexene, and 1-octene, still more preferably at least one selected from the group consisting of ethylene and 1-butene.

Examples of the polymer including a monomer unit derived from the monomer other than propylene include a propylene-ethylene copolymer, a propylene-1-butene copolymer, a propylene-1-hexene copolymer, a propylene-1-octene copolymer, a propylene-ethylene-1-butene copolymer, a propylene-ethylene-1-hexene copolymer, and a propylene-ethylene-1-octene copolymer.

In view of the dimensional stability of the molded body, the polymer (I) is preferably a propylene homopolymer, a propylene-ethylene copolymer, a propylene-1-butene copolymer, or a propylene-ethylene-1-butene copolymer, more preferably a propylene homopolymer.

The content of the polymer (I) is preferably 50 to 99% by mass, more preferably 60 to 90% by mass based on the total mass of the heterophasic propylene polymer material.

Preferably, the polymer (II) includes 20% by mass or more of a monomer unit derived from at least one α-olefin selected from the group consisting of ethylene and C4-C12 α-olefins and includes a monomer unit derived from propylene.

In the polymer (II), the content of the monomer unit derived from at least one α-olefin selected from the group consisting of ethylene and C4-C12 α-olefins may be 25f to 60% by mass, or may be 30% to 60% by mass.

In the polymer (II), the at least one α-olefin selected from the group consisting of ethylene and C4-C12 α-olefins is preferably at least one selected from the group consisting of ethylene and C4-C10 α-olefins, more preferably at least one selected from the group consisting of ethylene, 1-butene, 1-hexene, 1-octene, and 1-decene, still more preferably at least one selected from the group consisting of ethylene and 1-butene.

Examples of the polymer (II) include a propylene-ethylene copolymer, a propylene-ethylene-1-butene copolymer, a propylene-ethylene-1-hexene copolymer, a propylene-ethylene-1-octene copolymer, a propylene-ethylene-1-decene copolymer, a propylene-1-butene copolymer, a propylene-1-hexene copolymer, a propylene-1-octene copolymer, and a propylene-1-decene copolymer. Among these, a propylene-ethylene copolymer, a propylene-1-butene copolymer, and a propylene-ethylene-1-butene copolymer are preferred, and a propylene-ethylene copolymer is more preferred.

The content of the polymer (II) is preferably 1% to 50% by mass, more preferably 10% to 40% by mass based on the total mass of the heterophasic propylene polymer material.

The content of a CXIS component in the heterophasic propylene polymer material is preferably 50% to 99% by mass, more preferably 60% to 90% by mass based on the total mass of the heterophasic propylene polymer material.

The content of a CXS component in the heterophasic propylene polymer material is preferably 1% to 50 by mass, more preferably 10% to 40% by mass based on the total mass of the heterophasic propylene polymer material.

In this embodiment, the xylene insoluble (CXIS) component in the heterophasic propylene polymer material is composed mainly of the polymer (I), and the xylene soluble (CXS) component in the heterophasic propylene polymer material is composed mainly of the polymer (II).

Examples of the heterophasic propylene polymer material include a (propylene)-(propylene-ethylene) polymer material, a (propylene)-(propylene-ethylene-1-butene) polymer material, a (propylene)-(propylene-ethylene-1-hexene) polymer material, a (propylene)-(propylene-ethylene-1-octene) polymer material, a (propylene)-(propylene-1-butene) polymer material, a (propylene)-(propylene-1-hexene) polymer material, a (propylene)-(propylene-1-octene) polymer material, a (propylene)-(propylene-1-decene) polymer material, a (propylene-ethylene)-(propylene-ethylene) polymer material, a (propylene-ethylene)-(propylene-ethylene-1-butene) polymer material, a (propylene-ethylene)-(propylene-ethylene-1-hexene) polymer material, a (propylene-ethylene)-(propylene-ethylene-1-octene) polymer material, a (propylene-ethylene)-(propylene-ethylene-1-decene) polymer material, a (propylene-ethylene)-(propylene-1-butene) polymer material, a (propylene-ethylene)-(propylene-1-hexene) polymer material, a (propylene-ethylene)-(propylene-1-octene) polymer material, a (propylene-ethylene)-(propylene-1-decene) polymer material, a (propylene-1-butene)-(propylene-ethylene) polymer material, a (propylene-1-butene)-(propylene-ethylene-1-butene) polymer material, a (propylene-1-butene)-(propylene-ethylene-1-hexene) polymer material, a (propylene-1-butene)-(propylene-ethylene-1-octene) polymer material, a (propylene-1-butene)-(propylene-ethylene-1-decene) polymer material, a (propylene-1-butene)-(propylene-1-butene) polymer material, a (propylene-1-butene)-(propylene-1-hexene) polymer material, a (propylene-1-butene)-(propylene-1-octene) polymer material, a (propylene-1-butene)-(propylene-1-decene) polymer material, a (propylene-1-hexene)-(propylene-1-hexene) polymer material, a (propylene-1-hexene)-(propylene-1-octene) polymer material, a (propylene-1-hexene)-(propylene-1-decene) polymer material, a (propylene-1-octene)-(propylene-1-octene) polymer material, and a (propylene-1-octene)-(propylene-1-decene) polymer material.

The "(propylene)-(propylene-ethylene) polymer material" as described herein means "a heterophasic propylene polymer material in which the polymer (I) is a propylene homopolymer and the polymer (II) is a propylene-ethylene copolymer". The same applies to other similar expressions.

The heterophasic propylene polymer material is preferably a (propylene)-(propylene-ethylene) polymer material, a (propylene)-(propylene-ethylene-1-butene) polymer material, a (propylene-ethylene)-(propylene-ethylene) polymer material, a (propylene-ethylene)-(propylene-ethylene-1-butene) polymer material, or a (propylene-1-butene)-(propylene-1-butene) polymer material, more preferably a (propylene)-(propylene-ethylene) polymer material.

The limiting viscosity number ([η]I) of the polymer (I) is preferably 0.10 to 2.00 dL/g, more preferably 0.50 to 1.50 dL/g, still more preferably 0.70 to 1.40 dL/g.

The limiting viscosity number ([η]II) of the polymer (II) is preferably 1.00 to 10.00 dL/g, more preferably 2.00 to 10.00 dL/g, still more preferably 2.00 to 8.00 dL/g.

The ratio ([η]II/([η]I) of the limiting viscosity number ([η]II) of the polymer (II) to the limiting viscosity number ([η]I) of the polymer (I) is preferably 1 to 20, more preferably 1 to 10, still more preferably 1 to 9.

An example method for measuring the limiting viscosity number ([η]I) of the polymer (I) involves forming the polymer (I) and then measuring the limiting viscosity number of the polymer.

The limiting viscosity number ([η]II) of the polymer (II) is calculated from, for example, the following formula (6) using the limiting viscosity number ([η]Total) of the heterophasic propylene polymer material, the limiting viscosity number ([η]I) of the polymer (I), and the contents of the polymer (II) and the polymer (I).

$$[\eta]II=([\eta])Total-[\eta]I\times XI)/XII \quad (6)$$

[η]Total: the limiting viscosity number (dL/g) of the heterophasic propylene polymer material

[η]I: the limiting viscosity number (dL/g) of the polymer (I)

XI: the ratio of the mass of the polymer (I) to the total mass of the heterophasic propylene polymer material (the mass of the polymer (I)/the mass of the heterophasic propylene polymer material)

XII: the ratio of the mass of the polymer (II) to the total mass of the heterophasic propylene polymer material (the mass of the polymer (II)/the mass of the heterophasic propylene polymer material)

Here, XI and XII can be obtained from the mass balance in the polymerization.

XII may be calculated from the following formula by measuring the heat of fusion of the polymer (I) and the heat of fusion of the heterophasic propylene polymer material.

$$XII=1-(\Delta Hf)T/(\Delta Hf)P$$

(ΔHf)T: the heat of fusion (J/g) of the heterophasic propylene polymer material (ΔHf)P: the heat of fusion (J/g) of the polymer (I)

The limiting viscosity number ([η]CXIS) of the CXIS component is preferably 0.10 to 2.00 dL/g, more preferably 0.50 to 1.50 dL/g, still more preferably 0.70 to 1.40 dL/g.

The limiting viscosity number ([η]CXS) of the CXS component is preferably 1.00 to 10.00 dL/g, more preferably 2.00 to 10.00 dL/g, still more preferably 2.00 to 8.00 dL/g.

The ratio ([η]CXS/[η]CXIS) of the limiting viscosity number ([η]CXS) of the CXS component to the limiting viscosity number ([η]CXIS) of the CXIS component is preferably 1 to 20, more preferably 1 to 10, still more preferably 1 to 9.

The isotactic pentad fraction (also referred to as an mmmm fraction) of the polymer (I) is preferably 0.950 or more, more preferably 0.970 or more, in view of the rigidity and dimensional stability of a molded body made of the resin composition. The isotactic pentad fraction of the polymer (I) may be, for example, 1.000 or less.

The isotactic pentad fraction means the isotactic fraction in terms of pentad units. More specifically, the isotactic pentad fraction refers to the fraction of five contiguous meso-linked monomer units derived from propylene in terms of pentad units. When the target component is a copolymer, the isotactic pentad fraction refers to a value measured for a chain of monomer units derived from propylene.

In this specification, the isotactic pentad fraction refers to a value measured by $^{13}C$-NMR spectroscopy. Specifically, the isotactic pentad fraction is the fraction of the area of the mmmm peak in the area of the total absorption peak in the methyl carbon region obtained by $^{13}C$-NMR spectroscopy. The method for measuring the isotactic pentad fraction by $^{13}C$-NMR spectroscopy is described in, for example, A. Zambelli et al., Macromolecules, 6, 925 (1973). The absorption peaks obtained by $^{13}C$-spectroscopy are assigned in accordance with Macromolecules, 8, 687 (1975).

The melt flow rate of the polymer (I) at a temperature of 230° C. under a load of 2.16 kgf is preferably 5 g/10 min or more, more preferably 20 g/10 min to 300 g/10 min in view of the moldability of the resin composition.

In this specification, the melt flow rate of the heterophasic propylene polymer material (A) refers to a value measured at 230° C. under a load of 2.16 kgf in accordance with JIS K6758. The melt flow rate may hereinafter be referred to as an MFR. The melt flow rate of the heterophasic propylene polymer material (A) is 70 g/10 min or more and 300 g/10 min or less, preferably 80 g/10 min or more and 250 g/10 min or less, more preferably 90 g/10 min or more and 200 g/10 min or less.

The content of the heterophasic propylene polymer material (A) in the polypropylene resin composition is 20% by weight or more and 50% by weight or less, preferably 25% by weight or more and 50% by weight or less, based on 100% by weight of the total amount of the (A), (B-1), (B-2), (C), and (D).

Ethylene-α-Olefin Copolymers (B-1) and (B-2)

The polypropylene resin composition contains the ethylene-α-olefin copolymers (B-1) and (B-2). The components (B-1) and (B-2) may be collectively referred to below as a "component B".

With regard to the component B, the total content of the monomer unit derived from ethylene and the monomer unit derived from a C4 or higher α-olefin in the component B may be 100% by mass, provided that the total mass of the component B is 100% by mass.

Examples of the C4 or higher α-olefin include C4-C12 α-olefins. Examples of C4-C12 α-olefins include 1-butene, 1-pentene, 1-hexene, 4-methyl-1-pentene, 1-octene, and 1-decene. Among these, 1-butene, 1-hexene, and 1-octene are preferred. The α-olefins may be α-olefins having a cyclic structure, such as vinylcyclopropane and vinylcyclobutane.

Examples of the component B include an ethylene-1-butene copolymer, an ethylene-1-hexene copolymer, an ethylene-1-octene copolymer, an ethylene-1-decene copolymer, an ethylene-(3-methyl-1-butene) copolymer, and a copolymer of ethylene and an α-olefin having a cyclic structure.

In the component B, the content of the monomer unit derived from a C4 or higher α-olefin is preferably 1% to 49% by mass, more preferably 5% to 49% by mass, still more preferably 24% to 49% by mass, based on the total mass of the component B.

The component (B-1) is the ethylene-α-olefin copolymer (B-1) having a melt flow rate of 2 g/10 min or higher and 100 g/10 min or lower as determined at 190° C. under a load of 2.16 kgf in accordance with JIS-K-7210. The melt flow rate is preferably 2 g/10 min or higher and 60 g/10 min or lower, more preferably 3 g/10 min or higher and 50 g/10 min or lower.

The component (B-2) is the ethylene-α-olefin copolymer (B-2) having a melt flow rate of 1 g/10 min or lower as determined at 190° C. under a load of 2.16 kgf in accordance with JIS-K-7210. The melt flow rate is preferably 0.9 g/10 min or lower, more preferably 0.8 g/10 min or lower.

In view of the impact resistance of the molded body, the density of the component B is preferably 0.850 to 0.890 $g/cm^3$, more preferably 0.850 to 0.880 $g/cm^3$, still more preferably 0.855 to 0.870 $g/cm^3$.

The component B can be produced by polymerizing ethylene and a C4 or higher α-olefin using a polymerization catalyst.

Examples of the polymerization catalyst include homogeneous catalysts, such as metallocene catalysts, and Ziegler-Natta catalysts.

Examples of homogeneous catalysts include a catalyst containing an alkylaluminoxane and a Group 4 transition metal compound having a cyclopentadienyl ring; a catalyst containing a Group 4 transition metal compound having a cyclopentadienyl ring, a compound that reacts with the transition metal compound to form an ionic complex, and an organoaluminum compound; and a catalyst produced by modifying inorganic particles (e.g., silica, clay minerals) with a catalyst component (e.g., a Group 4 transition metal compound having a cyclopentadienyl ring, a compound that forms an ionic complex, an organoaluminum compound) such that the catalyst component is supported on the inorganic particles.

Examples of Zieglez-Natta catalysts include a catalyst containing a titanium-containing solid transition metal component and an organometallic component in combination.

The component B may be a commercial product. Examples of the commercial product of the component B include ENGAGE (registered trademark) available from Dow Chemical Japan Ltd.; TAFMER (registered trademark) available from Mitsui Chemicals, Inc.; NEO-ZEX (registered trademark) and ULT-ZEX (registered trademark) available from Prime Polymer Co., Ltd.; and EXCELLEN FX (registered trademark), SUMIKATHENE (registered trademark), and ESPRENE SPO (registered trademark) available from Sumitomo Chemical Co., Ltd.

The content of the ethylene-α-olefin copolymer (B-1) in the polypropylene resin composition is 15% by weight or more and 40% by weight or less, preferably 15% by weight or more and 35% by weight or less, more preferably 15% by weight or more and 30% by weight or less based on 100% by weight of the total amount of the (A), (B-1), (B-2), (C), and (D).

The content of the ethylene-α-olefin copolymer (B-2) in the polypropylene resin composition is 10% by weight or more and 20% by weight or less, preferably 10% by weight or more and 18% by weight or less, more preferably 10% by weight or more and 16% by weight or less, based on 100% by weight of the total amount of the (A), (B-1), (B-2), (C), and (D).

Glass Fiber (C)

The polypropylene resin composition contains the glass fiber (C).

Any glass fiber can be used without limitation. Examples of the type of glass fiber used include E-glass, C-glass, A-glass, and S-glass. Among these, E-glass is preferred. The method for producing the glass fiber is not limited. The glass fiber is produced by any one of known production methods.

The polypropylene resin composition may contain only one type of glass fiber or may contain two or more types of glass fibers.

The glass fiber length is preferably 2 to 20 mm, more preferably 3 to 10 mm. In view of the rigidity of the produced molded body, the glass fiber length is preferably 2 mm or more. In view of texture transferability, tactile sensation, and moldability (fluidity), the glass fiber length is preferably 20 mm or less.

The fiber length as used herein refers to, when the fiber is in the form of normal roving or strand, the length of the glass fiber before melt kneading used as a material as it is. When the fiber is in the form of glass fiber-containing pellets prepared by gathering and integrating many continuous filaments of glass fiber through melt extrusion described below, the fiber length refers to the length of one side of a pellet (in the extrusion direction) since the length of one side of the pellet (in the extrusion direction) is substantially the same as the length of the fibers in the pellet.

The term "substantially" as used herein specifically means that 50% or more, preferably 90% or more, of the fibers in the fiber-containing pellets (based on the total number of fibers in the fiber-containing pellets) have the same length as carbon fiber-containing pellets (in the extrusion direction), and the fibers are unlikely to break during the pellet preparation.

In this specification, the fiber length is determined by calculating the average length of 100 or more filaments of the fiber through measurement with a microscope.

A specific method for measuring the fiber length involves mixing glass fiber with surfactant-containing water, dropping and spreading the mixed water liquid on a thin glass plate, then measuring the lengths of 100 or more filaments of the glass fiber with a digital microscope (e.g., model: VHX-900 available from Keyence Corporation), and calculating the average glass fiber length.

The fiber diameter of the glass fiber is preferably 3 to 25 μm, more preferably 6 to 20 μm. To prevent breakage of the glass fiber, for example, during production of the resin composition and a molded body of the resin composition and during molding of the resin composition, the fiber diameter is preferably 3 μm or more. In view of the rigidity of the produced molded body, the fiber diameter is preferably 25 μm or less.

The fiber diameter is determined by cutting the fiber in the direction perpendicular to the fiber longitudinal direction, measuring the diameter through observation of the cross section with a microscope, and calculating the average diameter of 100 or more fragments of the fiber.

The glass fiber may be either surface-treater or non-surface-treated. To, for example, improve dispersibility in a polypropylene resin, the glass fiber is preferably surface-treated with, for example, an organic silane coupling agent, a titanate coupling agent, an aluminate coupling agent, a zirconate coupling agent, a silicone compound, a higher fatty acid, a fatty acid metal salt, or a fatty acid ester.

The glass fiber may be one subjected to a sizing (surface) treatment with a sizing agent. Examples of the type of sizing agent include epoxy sizing agents, aromatic urethane sizing agents, aliphatic urethane sizing agents, acrylic sizing agents, and maleic anhydride-modified polyolefin sizing agents. These sizing agents preferably melt at 200° C. or lower because they need to fuse when being melt-kneaded with a polypropylene resin.

The glass fiber may be either surface-treater or non-surface-treated. To, for example, improve dispersibility in a polypropylene resin, the glass fiber is preferably surface-treated with, for example, an organic silane coupling agent, a titanate coupling agent, an aluminate coupling agent, a zirconate coupling agent, a silicone compound, a higher fatty acid, a fatty acid metal salt, or a fatty acid ester.

Examples of the organic silane coupling agent used for surface treatment include vinyltrimethoxysilane, γ-chloropropyltrimethoxysilane, γ-methacryloxypropyltrimethoxysilane, γ-aminopropyltrimethoxysilane, and 3-acryloxypropyltrimethoxysilane. Examples of the titanate coupling agent include isopropyl triisostearoyl titanate, isopropyl tris(dioctylpyrophosphate) titanate, and isopropyl tri(N-aminoethyl) titanate. Examples of the aluminate coupling agent include acetoalkoxy aluminum diisopropylate. Examples of the zirconate coupling agent include tetra(2,2-diallyloxymethyl)butyl, and di(tridecyl)phosphite zirconate; and neopentyl (diallyl)oxy, and trineodecanoyl zirconate. Examples of the silicone compound include silicone oils and silicone resins.

Examples of the higher fatty acid used for surface treatment include oleic acid, capric acid, lauric acid, palmitic acid, stearic acid, montanic acid, caleic acid, linoleic acid, rosin acid, linolenic acid, undecanoic acid, and undecenoic acid. Examples of the higher fatty acid metal salt include sodium salts, lithium salts, calcium salts, magnesium salts, zinc salts, and aluminum salts of C9 or higher fatty acids, such as stearic acid and montanic acid. Of these, calcium stearate, aluminum stearate, calcium montanate, and sodium montanate are preferred. Examples of the fatty acid ester include polyhydric alcohol fatty acid esters, such as glycerol fatty acid esters, a-sulfone fatty acid esters, polyoxyethylene sorbitan fatty acid esters, sorbitan fatty acid esters, polyethylene fatty acid esters, and sucrose fatty acid esters.

The amount of the surface treating agent used is not limited but preferably 0.01 parts by weight to 5 parts by weight, more preferably 0.1 parts by weight to 3 parts by weight, relative to 100 parts by weight of the glass fiber.

The glass fiber can also be used in the form of so-called chopped strand glass fiber prepared by cutting an original glass fiber to a desired length. In particular, chopped strand glass fiber obtained by arranging sized strands of glass fiber in parallel and cutting the strands of glass fiber to a length of 2 mm to 20 mm is preferably used in view of, for example, the shrinkage resistance, rigidity, and impact strength of the resin composition and a molded body of the resin composition.

Specific examples of the glass fiber include T480H available from Nippon Electric Glass Co., Ltd.

The glass fiber can be used in the form of "glass fiber-containing pellets" prepared by previously gathering and integrating many continuous filaments of glass fiber through melt extrusion with, for example, predetermined amounts of the component (A), the component (B-1), the component (B-2), and/or other components. Such glass fiber-containing pellets are preferred in order to further improve, for example, the texture transferability and rigidity of the resin composition and the molded body of the resin composition.

For such glass fiber-containing pellets, the fiber length is preferably 2 to 20 mm, where the fiber length is the length of the glass fiber-containing pellets (in the extrusion direction) as described above.

Such glass fiber-containing pellets can be produced by any known method.

The glass fiber-containing pellets preferably have a glass fiber content of 20% by weight to 70% by weight on the basis of 100% by weight of the total amount of the pellets.

The use of glass fiber-containing pellets having a glass fiber content below 20% by weight in the present invention may degrade the physical properties, such as rigidity, of the resin composition and the molded body of the resin composition. In contrast, the use of glass fiber-containing pellets having a glass fiber content above 70% by weight may degrade the texture transferability, tactile sensation, and moldability (fluidity).

The content of the glass fiber (C) in the polypropylene resin composition is 20% by weight or more and 40% by weight or less, preferably 20% by weight or more and 38% by weight or less, more preferably 20% by weight or more and 36% by weight or less, based on 100% by weight of the total amount of the (A), (B-1), (B-2), (C), and (D).

Acid-Modified Polyolefin (D)

The polypropylene resin composition contains an acid-modified polyolefin (D). The acid-modified polyolefin (D) may be referred to below as a "modified polyolefin resin".

The modified polyolefin resin (acid-modified polyolefin (D)) is, for example, a resin produced by modifying a polyolefin resin with an unsaturated carboxylic acid and/or an unsaturated carboxylic acid derivative. The polyolefin resin used as a material of the modified polyolefin resin is composed of a homopolymer of one olefin or a copolymer of two or more olefins. In other words, the modified polyolefin resin is a resin produced by causing a homopolymer of one olefin or a copolymer of two or more olefins to react with an unsaturated carboxylic acid and/or an unsaturated carboxylic acid derivative. The modified polyolefin resin has a partial structure derived from an unsaturated carboxylic acid or an unsaturated carboxylic acid derivative in the molecule. Specific examples include modified polyolefin resins (a) to (c) described below. The polypropylene resin composition may contain one modified polyolefin resin or may contain two or more modified polyolefin resins.

(a): a modified polyolefin resin produced by bonding an unsaturated carboxylic acid and/or an unsaturated carboxylic acid derivative to an olefin homopolymer through graft polymerization.

(b): a modified polyolefin resin produced by bonding an unsaturated carboxylic acid and/or an unsaturated carboxylic acid derivative to a copolymer of two or more olefins through graft polymerization.

(c): a modified polyolefin resin produced by preparing a block copolymer through homopolymerization of an olefin and subsequent copolymerization of two or more olefins, and bonding an unsaturated carboxylic acid and/or an unsaturated carboxylic acid derivative to the block copolymer through graft polymerization.

Examples of the unsaturated carboxylic acid include maleic acid, fumaric acid, itaconic acid, acrylic acid, and methacrylic acid.

Examples of the unsaturated carboxylic acid derivative include acid anhydrides, ester compounds, amide compounds, imide compounds, and metal salts of unsaturated carboxylic acids. Specific examples of the unsaturated carboxylic acid derivative include maleic anhydride, itaconic anhydride, methyl acrylate, ethyl acrylate, butyl acrylate, methyl methacrylate, ethyl methacrylate, butyl methacrylate, 2-hydroxyethyl methacrylate, monoethyl maleate, diethyl maleate, monomethyl fumarate, dimethyl fumarate, acrylamide, methacrylamide, maleic acid monoamide, maleic acid diamide, fumaric acid monoamide, maleimide, N-butylmaleimide, and sodium methacrylate.

The unsaturated carboxylic acid is preferably maleic acid or acrylic acid. The unsaturated carboxylic acid derivative is preferably maleic anhydride or 2-hydroxyethyl methacrylate.

The modified polyolefin resin is preferably (c) described above. More preferably, the modified polyolefin resin is one produced by bonding maleic anhydride to a polyolefin resin containing a unit derived from ethylene and/or propylene as a main structural unit through graft polymerization.

In view of the rigidity and hardness of the molded body produced from the resin composition, the content of the structural unit derived from the unsaturated carboxylic acid and/or the unsaturated carboxylic acid derivative in the modified polyolefin resin is preferably 0.1% by weight to 20% by weight, more preferably 0.1% by weight to 10% by weight (provided that the amount of the modified polyolefin resin is 100% by weight). The content of the structural unit derived from the unsaturated carboxylic acid and/or the unsaturated carboxylic acid derivative is a value calculated by quantitatively determining absorption based on the unsaturated carboxylic acid and/or the unsaturated carboxylic acid derivative from the infrared absorption spectrum or the NMR spectrum.

The graft efficiency of the unsaturated carboxylic acid and/or the unsaturated carboxylic acid derivative in the modified polyolefin resin is preferably 0.51 or higher in view of the rigidity and impact strength of the molded body produced from the resin composition. The "graft efficiency of the modified polyolefin resin" means the "ratio of the amount of the unsaturated carboxylic acid and/or the unsaturated carboxylic acid derivative chemically bonded to the modified polyolefin resin to the total amount of the unsaturated carboxylic acid and/or the unsaturated carboxylic acid derivative chemically bonded to the resin and the unsaturated carboxylic acid and/or the unsaturated carboxylic acid derivative not chemically bonded to the resin contained in the resin". The graft efficiency in graft polymerization of the unsaturated carboxylic acid and/or the unsaturated carboxylic acid derivative can be determined by the following steps (1) to (9).

(1) The modified polyolefin resin (1.0 g) is dissolved in 100 ml of xylene;

(2) The xylene solution is dropped into 1000 ml of methanol with stirring to reprecipitate the modified polyolefin resin;

(3) The reprecipitated modified polyolefin resin is collected;

(4) The collected modified polyolefin resin is vacuum-dried at 80° C. for 8 hours to provide a purified modified polyolefin resin;

(5) The purified modified polyolefin resin is hot-pressed into a film with a thickness of 100 μm;

(6) The infrared absorption spectrum of the film is measured;

(7) The absorption based on the unsaturated carboxylic acid and/or the unsaturated carboxylic acid derivative is quantitively determined from the infrared absorption spectrum, and the content (X1) of the unsaturated carboxylic acid and/or the unsaturated carboxylic acid derivative that have reacted with the polyolefin resin in the modified polyolefin resin is calculated.

(8) Separately, the non-purified modified polyolefin resin is subjected to the steps (5) to (6) described above, and the content (X2) of the unsaturated carboxylic acid and/or the unsaturated carboxylic acid derivative in the non-purified modified polyolefin resin is calculated from the infrared absorption spectrum (X2 is the sum of the content (X1) of the unsaturated carboxylic acid and/or the unsaturated carboxylic acid derivative that have reacted with the polyolefin resin and the content of the unsaturated carboxylic acid and/or the unsaturated carboxylic acid derivative that do not have reacted with the polyolefin resin (i.e., that are free).

(9) The graft efficiency is calculated from Formula: Graft efficiency=X1/X2.

The MFR of the modified polyolefin resin is preferably 5 to 400 g/10 min, more preferably 10 to 200 g/10 min, still more preferably 20 to 150 g/10 min, in view of mechanical strength and production stability. The MFR is a value measured at 230° C. under a load of 2.16 kgf in accordance with JIS K7210.

The content of the acid-modified polyolefin (D) in the polypropylene resin composition is 0.1% by weight or more and 5% by weight or less, preferably 0.3% by weight or more and 5% by weight or less, more preferably 0.5% by weight or more and 5% by weight or less, based on 100% by weight of the total amount of the (A), (B-1), (B-2), (C), and (D).

Nucleating Agent (E)

The polypropylene resin composition may further include a nucleating agent (E).

In the present invention, the nucleating agent (E) is, for example, represented by the following general formula (I).

[Chem. 1]

(I)

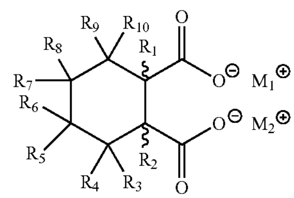

[in the formula (I), $M_1$ and $M_2$ are the same or different and each represent at least one metal cation selected from alkali metals and alkaline earth metals (e.g. sodium, calcium, strontium, lithium, preferably sodium) and monobasic aluminum, and R1, R2, R3, R4, R5, R6, R7, R8, R9, and R10 are the same or different and are individually selected from the group consisting of hydrogen, C1-C9 alkyl (wherein any two alkyl groups together may form a hydrocarbon ring having up to 6 carbon atoms), hydroxy, C1-C9 alkoxy, C1-C9 alkyleneoxy, amine and C1-C9 alkylamine, halogen (fluorine, chlorine, bromine, and iodine), and phenyl.]

Examples of C1-C9 alkyl groups in R1, R2, R3, R4, R5, R6, R7, R8, R9, and R10 include a methyl group, an ethyl group, an n-propyl group, and an isopropyl group. Examples of C1-C9 alkoxy groups include a methoxy group, an ethoxy group, an n-propoxy group, and an isopropoxy group. Examples of C1-C9 alkylamino groups include a methylamino group, an ethylamino group, a dimethylamino group, and a diethylamino group. Examples of halogen atoms include a fluorine atom, a chlorine atom, a bromine atom, and an iodine atom. Examples of C1-C9 alkyleneoxy groups include groups represented by the following general formula (II).

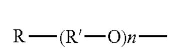

(II)

(wherein R represents a hydrogen atom or a C1-C3 alkyl group, R' represents a C2 or C3 alkylene group, and n represents an integer of 2 to 4. The total number of carbon atoms in R and R' is 9 or less.)

The group represented by the general formula (II) is preferably H—$(CH_2CH_2O)_2$—, H—$(CH_2CH_2O)_3$—, H—$(CH_2CH_2O)_4$—, $CH_3$—$(CH_2CH_2O)_2$—, $CH_3$—$(CH_2CH_2O)_3$—, $CH_3$—$(CH_2CH_2O)_4$—, $C_2H_5$—$(CH_2CH_2O)_2$—, $C_2H_5$—$(CH_2CH_2O)_3$—, $C_3H_7$—$(CH_2CH_2O)_2$—, $C_3H_7$—$(CH_2CH_2O)$—, H—$(CH(CH_3)CH_2O)_2$—, H—$(CH(CH_3)CH_2O)_3$—, $CH_3$—$(CH(CH_3)CH_2O)_2$—, or $C_2H_5$—$(CH(CH_3)CH_2O)_2$—.

Examples of the nucleating agent (E) represented by the general formula (I) include compounds represented by the following structural formula. The following compounds are examples where $M_1$ and $M_2$ are calcium, but $M_1$ and $M_2$ may be sodium or other elements.

[Chem. 2]

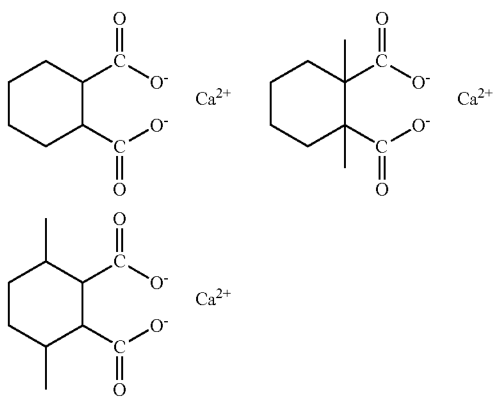

[Chem. 3]

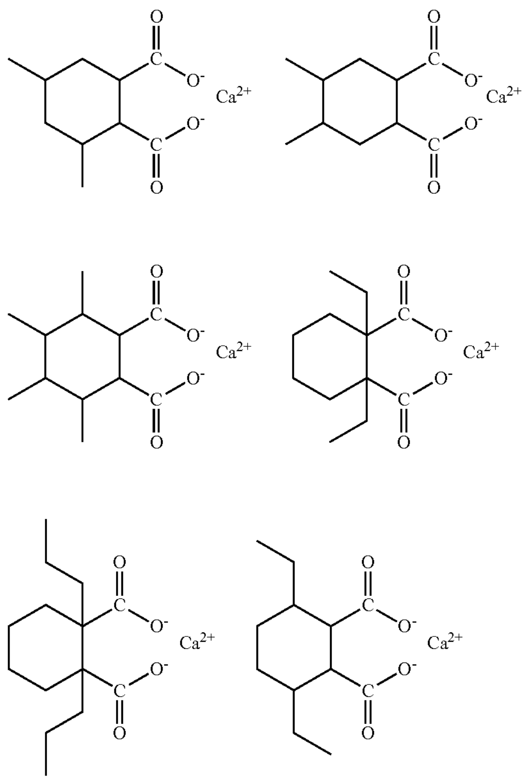

-continued

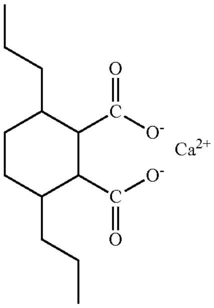

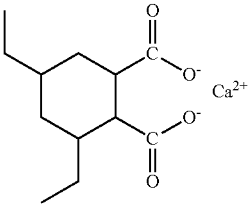

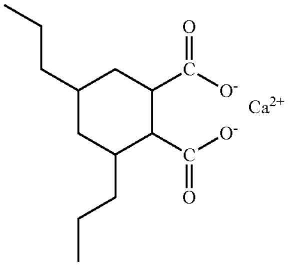

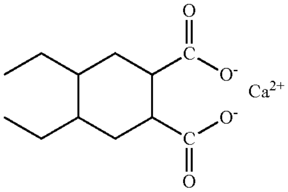

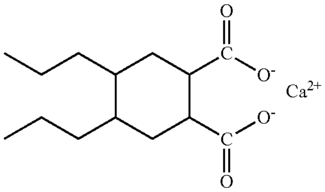

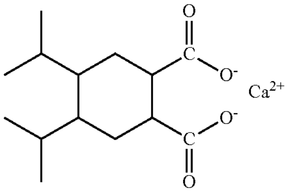

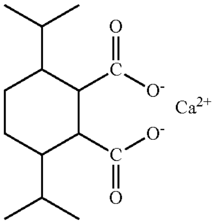

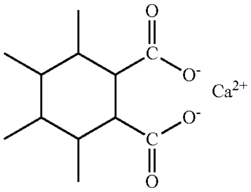

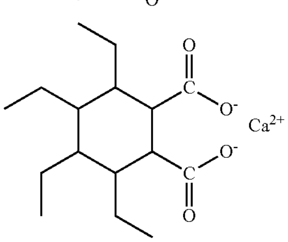

-continued

[Chem. 4]

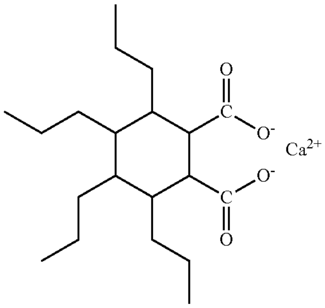

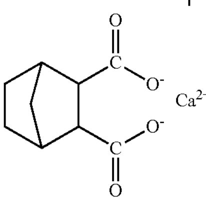

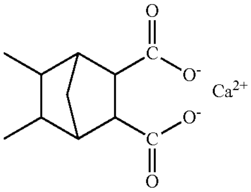

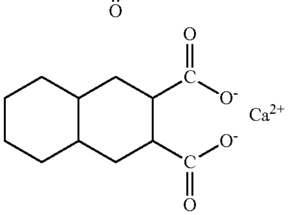

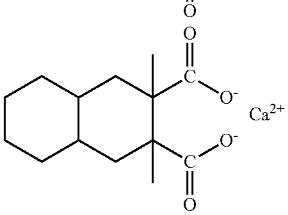

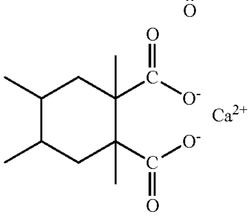

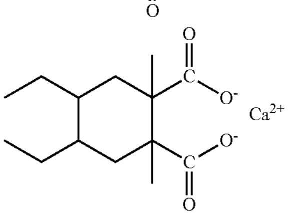

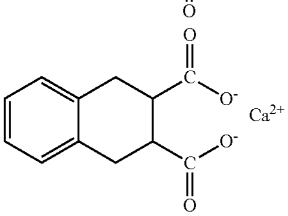

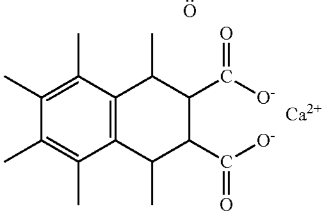

The nucleating agent (E) is preferably a compound where R1, R2, R3, R4, R5, R6, R7, R8, R9, and R10 each independently represent a hydrogen atom or a C1-C3 alkyl group, more preferably calcium 1,2-cyclohexanedicarboxylate represented by the following structural formula.

[Chem. 5]

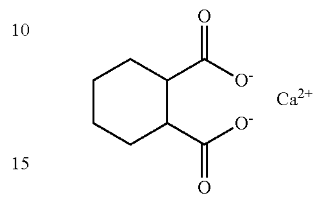

The nucleating agent (E) may be mixed with a dispersant in order to improve dispersibility in the polypropylene resin composition. Examples of the dispersant include fatty acids, alkyl esters of fatty acids, metal salts of fatty acids, C10-C30 alcohols, and polyhydric alcohols and esters of polyhydric alcohols.

Suitable examples of the fatty acids include C10-C24 fatty acids. Examples of the metal salts of fatty acids include metal salts of alkali metals or alkaline earth metals. Examples of the alkali metals include sodium, potassium, and lithium. Examples of the alkaline earth metals include calcium, magnesium, and zinc. Examples of the polyhydric alcohols and the esters of polyhydric alcohols include glycerol, ethylene glycol, propylene glycol, pentaerythritol, dipentaerythritol, tripentaerythritol, sorbitol, and esters thereof. Of there, metal salts of fatty acids are preferably used.

The nucleating agent (E) is preferably in the form of particles. With regard to the particle diameter of the nucleating agent (E), the average particle diameter determined by laser diffraction particle diameter distribution analysis is 0.01 to 10 μm, preferably 0.01 to 5 μm, more preferably 0.01 to 3 μm. Laser diffraction particle diameter distribution analysis is a method for determining the particle diameter distribution using a laser diffraction particle diameter distribution analyzer (HELOS (product name) available from Sympatec).

Examples of the method for producing the nucleating agent (E) include the methods described in Japanese Translation of PCT International Application Nos. 2004-525227 and 2009-504842. Calcium 1,2-cyclohexanedicarboxylate is available from Milliken Chemical and Milliken Japan G.K. under the trade name of Hyperform HPN-20E (calcium 1,2-cyclohexanedicarboxylate content: 66% by weight).

The most preferred nucleating agent (E) is as described below.

(Trade name) Hyperform HPN-68L (available from Milliken Japan G.K.)

Chemical name of main component: disodium-(1R,2R,3S,4S)-bicyclo[2.2.1]heptane-2,3-dicarboxylate (content: 80% by weight).

Chemical formula of main component: as described below

[Chem. 6]

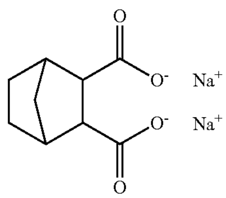

The content of the nucleating agent (E) in the polypropylene resin composition is 0.01% by weight or more and 0.5% by weight or less based on 100% by weight of the total amount of the (A), (B-1), (B-2), (C), and (D).

Lubricant (F)

The polypropylene resin composition may further include a lubricant (F).

In the present invention, a lubricant known in the related art can be appropriately used as the lubricant (F). The lubricant (F) is preferably a fatty acid amide (F-1); a silicone lubricant (F-2), such as silicone oil or silicone gum; a fatty acid metal salt; or a higher alcohol, more preferably the fatty acid amide (F-1) or the silicone lubricant (F-2). The polypropylene resin composition may contain only one lubricant (F) or may contain two or more lubricants (F).

Example of the fatty acid residue of the fatty acid amide (F-1) include residues derived from saturated and unsaturated fatty acids with about 5 to 30 carbon atoms. The fatty acid amide is preferably a compound represented by $RCONH_2$ (wherein R represents a C5-C21 alkyl or alkenyl group). Specific examples of the fatty acid amide include oleic acid amide, stearic acid amide, erucic acid amide, behenic acid amide, palmitic acid amide, myristic acid amide, lauric acid amide, caprylic acid amide, caproic acid amide, n-oleyl palmitamide, n-oleyl erucamide, and dimers thereof. These lubricants are suitable for modifying stickiness in use specific to the use of random polypropylene polymers. In particular, erucic acid amide is preferably used. The polypropylene resin composition may contain only one fatty acid amide (F-1) or may contain two or more fatty acid amides (F-1).

Examples of commercial products include Diamid Y available from Nippon Kasei Co., Ltd., Armide HT-P available from Lion Akzo Co., Ltd., Neutron available from Nippon Fine Chemical Co., Ltd., Diamid KN available from Nippon Kasei Chemical Co., Ltd., and Neutron S available from Nippon Fine Chemical Co., Ltd.

The content of the fatty acid amide (F-1) in the polypropylene resin composition is preferably 0.1 by weight or more and 1.0% by weight or less based on 100% by weight of the total amount of the (A), (B-1), (B-2), (C), and (D).

Suitable examples of the silicone lubricant (F-2) include silicone oils, high molecular weight silicones (silicone gums), and silicone powders.

Suitable examples of silicone oils include dimethyl silicone oil, phenyl methyl silicone oil, alkyl silicone oil, fluorosilicone oil, tetramethyl tetraphenyl trisiloxane, and modified silicone oils.

High molecular weight silicones (silicone gums) having weight-average molecular weights of 100,000 or more are normally used as high molecular weight silicones (silicone gums). Such high molecular weight silicones (silicone gums) can be entangled with the molecules of the constituent materials and can maintain the surface condition for a long period of time. The weight-average molecular weight of silicone gum is preferably 100,000 to 800,000, more preferably 450,000 to 650,000. High molecular weight silicones (silicone gums) are preferably non-crosslinked.

The polypropylene resin composition may contain only one silicone lubricant (F-2) or may contain two or more silicone lubricants (F-2).

The content of the silicone lubricant (F-2) in the polypropylene resin composition is preferably 0.5% by weight or more and 3.0% by weight or less, more preferably 1.0% by weight or more and 1.5% by weight or less, based on 100% by weight of the total amount of the (A), (B-1), (B-2), (C), and (D).

Other Additives

The polypropylene resin composition may contain known additives. Examples of additives include neutralizers, antioxidants, UV absorbers, light stabilizers, antistatic agents, anti-blocking agents, processing aids, organic peroxides, colorants (e.g., inorganic pigments, organic pigments, pigment dispersants), foaming agents, foam nucleating agents, plasticizers, flame retardants, cross-linking agents, cross-linking aids, brightening agents, anti-bacterial agents, light diffusers, inorganic fillers, and anti-scratch agents. The polypropylene resin composition may contain only one of these additives or may contain two or more of these additives. Of these additives, neutralizers, antioxidants, UV absorbers, light stabilizers, and colorants are preferably used. The polypropylene resin composition preferably contains, in addition to the components described above, only at least one selected from the group consisting of organic peroxides, neutralizers, antioxidants, UV absorbers, light stabilizers, and colorants.

Examples of neutralizers include metal salts of higher fatty acids (metal soaps), hydrotalcites, and oxides or hydroxides of alkaline earth metals. The polypropylene resin composition may contain only one neutralizer or may contain two or more neutralizers.

The higher fatty acids that constitute the metal salts of higher fatty acids (metal soaps) preferably, for example, have 10 to 30 carbon atoms, more preferably have 12 to 18 carbon atoms. The metal salt is preferably, for example, a calcium salt, a sodium salt, a magnesium salt, a lithium salt, an aluminum salt, or a zinc salt, more preferably a calcium salt or a zinc salt. A calcium salt or zinc salt of stearic acid is preferred.

Hydrotalcites may be natural minerals or synthetic products, and the crystal structure, crystal particle diameter, moisture content of hydrotalcites may be selected as appropriate. Hydrotalcites may be surface-treated as needed.

Hydrotalcites are preferably represented by the following formula.

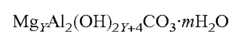

$$Mg_YAl_2(OH)_{2Y+4}CO_3 \cdot mH_2O$$

(wherein Y satisfies Y≥4, and m represents a positive number.)

Hydrotalcites are more preferably represented by the following formulas.

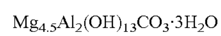

$$Mg_{4.5}Al_2(OH)_{13}CO_3 \cdot 3H_2O$$

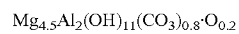

$$Mg_{4.5}Al_2(OH)_{11}(CO_3)_{0.8} \cdot O_{0.2}$$

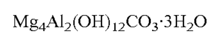

$$Mg_4Al_2(OH)_{12}CO_3 \cdot 3H_2O$$

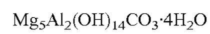

$$Mg_5Al_2(OH)_{14}CO_3 \cdot 4H_2O$$

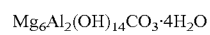

$$Mg_6Al_2(OH)_{14}CO_3 \cdot 4H_2O$$

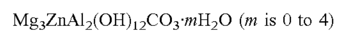

$$Mg_3ZnAl_2(OH)_{12}CO_3 \cdot mH_2O \text{ (} m \text{ is 0 to 4)}$$

The oxides or hydroxides of alkaline earth metals are oxides or hydroxides of the Group 2 metal elements in the periodic table. Examples of the oxides or hydroxides of alkaline earth metals include calcium oxide, magnesium oxide, calcium hydroxide, and magnesium hydroxide. Calcium hydroxide is preferred.

The amount of the neutralizer mixed is, for example, 0.001 to 0.5 parts by weight relative to 100 parts by weight of the resin composition containing the components (A), (B-1), (B-2), (C), and (D). The amount of the neutralizer mixed is preferably 0.005 to 0.2 parts by weight, more preferably 0.01 to 0.2 parts by weight.

Examples of antioxidants include phenolic antioxidants, phosphorus antioxidants, sulfur antioxidants, hydroxylamine antioxidants, and metal deactivators.

Preferred antioxidants are phenolic antioxidants, phosphorus antioxidants, and sulfur antioxidants.

Examples of phenolic antioxidants include tetrakis[methylene-3(3',5'-di-t-butyl-4-hydroxyphenyl)propionate]methane, octadecyl-3-(3,5-di-t-butyl-4-hydroxyphenyl)propionate, 3,9-bis[2-(3-(3-t-butyl-4-hydroxy-5-methylphenyl) propionyloxy)-1,1-dimethylethyl]-2,4,8,10-tetraoxaspiro [5·5]undecane, triethylene glycol-N-bis-3-(3-t-butyl-5-methyl-4-hydroxyphenyl)propionate, 1,6-hexanediol bis[3-(3,5-di-t-butyl-4-hydroxyphenyl)propionate], 2,2-thiobis-diethylene bis[3-(3,5-di-t-butyl-4-hydroxyphenyl) propionate], and tocopherols.

In view of the hue stability of the polypropylene resin composition, 3,9-bis[2-(3-(3-t-butyl-4-hydroxy-5-methylphenyl)propionyloxy)-1,1-dimethylethyl]-2,4,8,10-tetraoxaspiro[5·5]undecane is preferred.

The amount of the phenolic antioxidant mixed is 0.01 to 2 parts by weight relative to 100 parts by weight of the resin composition containing the components (A), (B-1), (B-2), (C), and (D). The amount of the phenolic antioxidant mixed is preferably 0.01 to 1 part by weight, more preferably 0.01 to 0.5 parts by weight.

In view of the processing stability of the polypropylene resin composition, examples of phosphorus antioxidants include tris(2,4-di-t-butylphenyl)phosphite, bis(2,4-di-t-butylphenyl)pentaerythritol diphosphite, and 2,4,8,10-tetra-t-butyl-6-[3-(3-methyl-4-hydroxy-5-t-butylphenyl)propoxy] dibenzo[d,f][1,3,2]dioxaphosphepin.

The amount of the phosphorus antioxidant mixed is 0.01 to 2 parts by weight relative to 100 parts by weight of the resin composition containing the components (A), (B-1), (B-2), (C), and (D). The amount of the phenolic antioxidant mixed is preferably 0.01 to 1 part by weight, more preferably 0.01 to 0.5 parts by weight.

In view of the heat aging resistance of the polypropylene resin composition, examples of sulfur antioxidants include dimyristyl 3,3'-thiodipropionate, neopentanetetrayltetrakis (3-laurylthiopropionate), bis[2-methyl-4-(3-n-alkyl(C12-C14)thiopropionyloxy)-5-t-butylphenyl]sulfide. C12 represents 12 carbon atoms, and C14 represents 14 carbon atoms.

The amount of the sulfur antioxidant mixed is 0.01 to 2 parts by weight relative to 100 parts by weight of the resin composition containing the components (A), (B-1), (B-2), (C), and (D). The amount of the phenolic antioxidant mixed is preferably 0.01 to 1 part by weight, more preferably 0.01 to 0.5 parts by weight.

Examples of UV absorbers include phenyl salicylate, 4-t-butylphenyl salicylate, 2,4-di-t-butylphenyl 3',5'-di-t-butyl-4'-hydroxybenzoate, myristyl 3,5-di-t-butyl-4-hydroxybenzoate, lauryl 3,5-di-t-butyl-4-hydroxybenzoate, palmityl 3,5-di-t-butyl-4-hydroxybenzoate, stearyl 3,5-di-t-butyl-4-hydroxybenzoate, behenyl 3,5-di-t-butyl-4-hydroxybenzoate, montanyl 3,5-di-t-butyl-4-hydroxybenzoate, 4-t-octylphenyl salicylate, 2,4-dihydroxybenzophenone, 2-hydroxy-4-methoxybenzophenone, 2-hydroxy-4-octoxybenzophenone, 2,2'-dihydroxy-4-methoxybenzophenone, bis(5-benzoyl-4-hydroxy-2-methoxyphenyl)methane, 2,2',4,4'-tetrahydroxybenzophenone, 2-(2'-hydroxy-5'-methylphenyl)benzotriazole, 2-(3',5'-di-t-butyl-2'-hydroxyphenyl)benzotriazole, 2-(5'-t-butyl-2'-hydroxyphenyl)benzotriazole, 2-(2'-hydroxy-5'-t-octylphenyl)benzotriazole, 2-(3-t-butyl-2-hydroxy-5-methylphenyl)-5-chlorobenzotriazole, 2-(3'-sec-butyl-2'-hydroxy-5'-t-butylphenyl)benzotriazole, 2-(2'-hydroxy-4'-octyloxyphenyl)benzotriazole, 2-(3',5'-di-t-amyl-2'-hydroxyphenyl)benzotriazole, and 2-[2'-hydroxy-3',5'-bis(α,α-dimethylbenzyl)phenyl]-2H-benzotriazole.

To provide the resin composition with good hue, preferred UV absorbers are 2,4-di-t-butylphenyl 3',5'-di-t-butyl-4'-hydroxybenzoate, lauryl 3,5-di-t-butyl-4-hydroxybenzoate, palmityl 3,5-di-t-butyl-4-hydroxybenzoate, stearyl 3,5-di-t-butyl-4-hydroxybenzoate, and behenyl 3,5-di-t-butyl-4-hydroxybenzoate.

In general, the amount of the UV absorber mixed is typically 0.01 to 2 parts by weight relative to 100 parts by weight of the resin composition containing the components (A), (B-1), (B-2), (C), and (D). The amount of the phenolic antioxidant mixed is preferably 0.01 to 1 part by weight, more preferably 0.01 to 0.5 parts by weight.

Light stabilizers with low molecular weights or oligomer-type high molecular weights may be used as light stabilizers. Examples of light stabilizers include bis(2,2,6,6-tetramethyl-4-piperidyl) sebacate, a mixture containing bis(1,2,2,6,6-pentamethyl-4-piperidyl) sebacate and methyl 1,2,2,6,6-pentamethyl-4-piperidyl sebacate, bis(1,2,2,6,6-pentamethyl-4-piperidyl)[[3,5-bis(1,1-dimethylethyl)-4-hydroxyphenyl]methyl]butylmalonate;

a reaction product between decanedioic acid bis(2,2,6,6-tetramethyl-1(octyloxy)-4-piperidyl) ester, 1,1-dimethylethyl hydroperoxide, and octane; 4-benzoyloxy-2,2,6,6-tetramethylpiperidine, an ester mixture of 2,2,6,6-tetramethyl-4-piperidinol and a higher fatty acid, tetrakis(2,2,6,6-tetra-methyl-4-piperidyl)-1,2,3,4-butanetetracarboxylate, tetrakis(1,2,2,6,6-penta-methyl-4-piperidyl)-1,2,3,4-butanetetracarboxylate, a polycondensation product of dimethyl succinate and 4-hydroxy-2,2,6,6-tetramethyl-1-piperidineethanol, poly[{(6-(1,1,3,3-tetramethylbutyl)amino-1,3,5-triazin-2,4-diyl){(2,2,6,6-tetramethyl-4-piperidyl) imino}hexamethylene {(2,2,6,6-tetramethyl-4-piperidyl)imino}}, a polycondensation product of dibutylamine/1,3,5-triazine/N,N'-bis(2,2,6,6-tetramethyl-4-piperidyl-1,6-hexamethylenediamine and N-(2,2,6,6-tetramethyl-4-piperidyl)butylamine, N,N',N'',N'''-tetrakis-(4,6-bis-(butyl-(N-methyl-2,2,6,6-tetramethylpiperidin-4-yl)amino)-triazin-2-yl)-4,7-diazadecane-1,10-diamine, and mixed {1,2,2,6,6-pentamethyl-4-piperidyl/β,β,β',β'-tetramethyl-3,9-[2,4,8,10-tetraoxaspiro(5,5)undecane] dimethyl}-1,2,3,4 butanetetracarboxylate.

To provide the resin composition with high light stability, preferred light stabilizers are bis(2,2,6,6-tetramethyl-4-piperidyl) sebacate; a reaction product between decanedioic acid bis(2,2,6,6-tetramethyl-1(octyloxy)-4-piperidyl) ester, 1,1-dimethylethyl hydroperoxide, and octane; tetrakis(2,2,6,6-tetra-methyl-4-piperidyl)-1,2,3,4-butanetetracarboxylate; tetrakis(1,2,2,6,6-penta-methyl-4-piperidyl)-1,2,3,4-butanetetracarboxylate; a reaction product between decanedioic acid bis(2,2,6,6-tetramethyl-1(octyloxy)-4-piperidyl) ester, 1,1-dimethylethyl hydroperoxide, and octane; a polycondensation product of dimethyl succinate and 4-hydroxy-2,2,6,6-tetramethyl-1-piperidineethanol; and poly[({6-(1,1,3,3-tetramethylbutyl)amino-1,3,5-triazin-2,4-diyl}{(2,2,6,6-tetramethyl-4-piperidyl)imino}hexamethylene{(2,2,6,6-tetramethyl-4-piperidyl)imino}}.

In general, the amount of the light stabilizer mixed is typically 0.01 to 2 parts by weight relative to 100 parts by weight of the resin composition containing the components (A), (B-1), (B-2), (C), and (D). The amount of the phenolic antioxidant mixed is preferably 0.01 to 1 part by weight, more preferably 0.01 to 0.5 parts by weight.

Examples of colorants include inorganic pigments and organic pigments. Examples of inorganic pigments include iron oxide, titanium oxide, zinc oxide, red iron oxide, cadmium red, cadmium yellow, ultramarine blue, cobalt blue, titanium yellow, white lead, red lead, yellow lead, and dark blue. Examples of organic pigments include carbon black, quinacridone, polyazo yellow, anthraquinone yellow, polyazo red, azo lake yellow, perylene, phthalocyanine green, phthalocyanine blue, and isoindolinone yellow. The polypropylene resin composition may contain only one colorant or may contain two or more colorants. To disperse a pigment in the resin composition, the polypropylene resin composition may contain a pigment and a pigment dispersant.

A colorant (pigment) can be added as a masterbatch.

The amount of the colorant mixed is, for example, 0.001 to 10 parts by weight relative to 100 parts by weight of the resin composition containing the components (A), (B-1), (B-2), (C), and (D). The amount of the colorant mixed is preferably 0.005 to 5 parts by weight, more preferably 0.01 to 3 parts by weight.

Examples of organic peroxides include bis(tert-butylperoxyisopropyl)benzene. An organic peroxide can be added as an organic peroxide masterbatch.

The amount of the organic peroxide mixed is, for example, 0.001 to 5 parts by weight relative to 100 parts by weight of the resin composition containing the components (A), (B-1), (B-2), (C), and (D). The amount of the organic peroxide mixed is preferably 0.005 to 1 part by weight, more preferably 0.01 to 1 part by weight.

The polypropylene resin composition may contain a resin or rubber other than the components (A), (B-1), (B-2), (C), and (D).

Examples of the resin or rubber include thermoplastic resins, such as polystyrenes (e.g. polystyrene, poly(p-methylstyrene), poly(α-methylstyrene), AS (acrylonitrile/styrene copolymer) resin), ABS (acrylonitrile/butadiene/styrene copolymer) resin, AAS (special acrylic rubber/acrylonitrile/styrene copolymer) resin, ACS (acrylonitrile/chlorinated polyethylene/styrene copolymer) resin, polychloroprene, chlorinated rubber, polyvinyl chloride, polyvinylidene chloride, acrylic resin, ethylene/vinyl alcohol copolymer resin, fluororesin, polyacetal, grafted polyphenylene ether resin and polyphenylene sulfide resin, polyurethane, polyamide, polyester resin (e.g. polyethylene terephthalate, polybutylene terephthalate), polycarbonate, polysulfone, polyetheretherketone, polyethersulfone, aromatic polyester resin; epoxy resin, diallyl phthalate prepolymer, silicone resin, silicone rubber, polybutadiene, 1,2-polybutadiene, polyisoprene, styrene/butadiene copolymer, butadiene/acrylonitrile copolymer, epichlorohydrin rubber, acrylic rubber, and natural rubber.

The polypropylene resin composition may contain a polymer produced by polymerizing a plant-derived monomer extracted from a biomaterial. Examples of the polymer include PLA resin (polylactic acid).

The polypropylene resin composition, additives added to the polypropylene resin composition, other resins and rubbers, and other components can be melt-kneaded by a known method at 180° C. or higher, preferably at 180° C. to 300° C., more preferably 180° C. to 250° C. The melt-kneading can be performed by using, for example, a melt extruder or a Banbury mixer.

Examples of the method for mixing the nucleating agent (E) with the components (A), (B-1), (B-2), (C), and (D) and other components include methods (1) to (3) described below.

(1) A method of mixing a required amount of the nucleating agent (E) with a mixture of required amounts of the components (A), (B-1), (B-2), (C), and (D) and other components, (2) A method including a step (step (1)) of mixing 100 parts by weight of any one of the components (A), (B-1), and (B-2) or 100 parts by weight of a mixture of the components (A), (B-1), (B-2), (C), and (D) and other components with 1 to 100 parts by weight, preferably 1 to 50 parts by weight, more preferably 5 to 30 parts by weight, of the nucleating agent (E) to produce a masterbatch, and a step (step (2)) of mixing the masterbatch with a mixture containing the components (A), (B-1), (B-2), (C), and (D) and other components, (3) A method including a step (step (3)) of mixing 100 parts by weight of the additives (at least one additive) with 10 to 900 parts by weight, preferably 10 to 500 parts by weight, more preferably 20 to 200 parts by weight, of the nucleating agent (E) to form a mixture, a step (step (4)) of solidifying the mixture into granules, and a step (step (5)) of mixing a predetermined amount of the granules with a mixture of required amounts of the components (A), (B-1), (B-2), (C), and (D) and other components.

Of these methods, the method (2) using a masterbatch can produce a polypropylene resin composition having an excellent balance between tensile strength and impact resistance. The "required amount" means the amount corresponding to the amount defined in the present invention. The "predetermined amount" means that the amount of a component in the produced final mixture satisfies the amount defined in the present invention.

A melt kneader used in the method for producing the polypropylene resin composition is, for example, a known melt kneader. Examples of the melt kneader include single-screw extruders, twin-screw co-rotating extruders (e.g., ZSK (registered trademark) available from Wernw Pfleideren, TEM (registered trademark) available from Toshiba Machine Co., Ltd., TEX (registered trademark) available from The Japan Steel Works, Ltd., and KZW (registered trademark) available from Technovel Corporation), twin-screw counter-rotating extruder (CMP (registered trademark) and TEX (registered trademark) available from The Japan Steel Works, Ltd.; FCM (registered trademark), NCM (registered trademark), and LCM (registered trademark) available from Kobe Steel, Ltd.).

Examples of the shape of the polypropylene resin composition include a strand shape, a sheet shape, a flat plate shape, and a pellet shape formed by cutting strands into an appropriate length. To mold the polypropylene resin composition, the shape is preferably a pellet shape with a length of 1 to 50 mm in view of the production stability of the obtained molded body.

The molded body is produced by molding the polypropylene resin composition by various molding methods. The shape, size, and other features of the molded body are appropriately selected.

Examples of the method for producing a molded body include an injection molding method, a press molding method, a vacuum molding method, a foam molding method, and an extrusion molding method that are commonly used industrially. Examples also include a molding method for attaching the polypropylene resin composition to the same type of resin or other resins, and a coextrusion method.

The molded body is preferably an injection molded body produced by injection molding. Examples of the injection molding method include a typical injection molding method, an injection foam molding method, a supercritical injection foam molding method, an ultra-high speed injection molding method, an injection compression molding method, a gas-assisted injection molding method, a sandwich molding method, a sandwich foam molding method, and an insert-outsert molding method.

Examples of applications of the molded body include automotive materials, home appliance materials, monitor materials, OA equipment materials, medical materials, drain pans, toiletry materials, bottles, containers, sheets, films, and building materials. Automotive materials and home appliance materials are preferred, and automotive materials are more preferred.

Examples of automotive materials include interior parts, such as door trims, pillars, instrumental panels, consoles, rocker panels, armrests, door panels, and spare tire covers; exterior parts, such as bumpers, spoilers, fenders, and side steps; other parts, such as air intake ducts, coolant reservoir tanks, fender liners, fans, and under deflectors; and integrally molded parts, such as front-end panels.

Examples of home appliance materials include materials for washing machines (e.g., outer tubs, inner tubs, lids, pulsators, and balancers), materials for dryers, materials for vacuum cleaners, materials for rice cookers, materials for pots, materials for warming machines, materials for dishwashers, and materials for air purifiers.

EXAMPLES

The present invention is described below in more detail with reference to Examples/Comparative Examples. The technical scope of the present invention is not limited by these Examples in any way.

(1) Component (A) (Heterophasic Propylene Polymer Material)

The component A (component (A-1) or (A-2) described below) was produced by a polymerizing a propylene homopolymer in a first polymerization step and polymerizing an ethylene-propylene copolymer in a second polymerization step in the presence of a polymerization catalyst prepared by the method described in Example 1 in JP-A-2004-182981.

Component (A-1)

Propylene-(Propylene-Ethylene) Polymer Material

- MFR (measured at temperature of 230° C. under load of 2.16 kgf): 138 g/10 min
- Limiting viscosity number ([η]I) of propylene homopolymer component: 0.78 dl/g
- Content of propylene-ethylene copolymer component: 10.0% by weight
- Ethylene content of propylene-ethylene copolymer component: 31% by weight
- Limiting viscosity number ([η]II) of propylene-ethylene copolymer component: 5.1 dl/g
- Melting point: 162° C.

Component (A-2)

Propylene-(Propylene-Ethylene) Polymer Material

- MFR (measured at temperature of 230° C. under load of 2.16 kgf): 90 g/10 min
- Limiting viscosity number ([η]I) of propylene homopolymer component: 0.79 dl/g
- Content of propylene-ethylene copolymer component: 11.0% by weight
- Ethylene content of propylene-ethylene copolymer component: 32% by weight
- Limiting viscosity number ([η]II) of propylene-ethylene copolymer component: 7.0 dl/g
- Melting point: 162° C.

(2-1) Component (B-1) (Ethylene-α-Olefin Copolymer)

(B-1-1) Ethylene-Butene Random Copolymer

- Product name: TAFMER DF7350 (available from Mitsui Chemicals, Inc.)
- Density: 0.870 (g/cm$^3$)
- MFR (190° C., load 2.16 kg): 35 g/10 min (B-1-2) Ethylene-Octene Random Copolymer

- Product name: ENGAGE EG8137 (available from Dow Chemical Japan Limited)
- Density: 0.870 (g/cm$^3$)
- MFR (190° C., load 2.16 kg): 13 g/10 min (2-2) Component (B-2) (Ethylene-α-Olefin Copolymer)

(B-2-1) Ethylene-Butene Random Copolymer

- Product name: ENGAGE EG7387 (available from Dow Chemical Japan Limited)
- Density: 0.872 (g/cm$^3$)
- MFR (190° C., load 2.16 kg): 0.5 g/10 min (B-2-2) Ethylene-Octene Random Copolymer

- Product name: ENGAGE EG8150 (available from Dow Chemical Japan Limited)
- Density: 0.868 (g/cm$^3$)
- MFR (190° C., load 2.16 kg): 0.5 g/10 min (3) Component (C) (Glass Fiber)

- Glass fiber (chopped strand),
- Product name: TP480 (available from Nippon Electric Glass Co., Ltd.)

(4) Component (D) (Acid-Modified Polyolefin)

- Maleic anhydride-modified PP
- Product name: MPA101 (available from Sumitomo Chemical Co., Ltd.)

(5) Component (E) (Nucleating Agent)

- Mixture containing disodium-(1R,2R,3S,4S)-bicyclo[2.2.1]heptane-2,3-dicarboxylate as a main component (the content of main component: 80% by weight)
- Product name: Hyperform HPN-68L (available from Milliken Japan G.K.)

(6) Component (F) (Lubricant)

(F-1) Fatty Acid Amide

- Product name: Neutron-S (available from Nippon Fine Chemical Co., Ltd.)
- Chemical name: Erucamide (F-2) Silicone Lubricant

- A lubricant masterbatch (F'-2) containing a silicone lubricant was used.

(F'-2) Silicone Lubricant Masterbatch

- Product name: TEGOMER (registered trademark) Antiscratch 100 (the content of organo-modified siloxane compound in the masterbatch: about 503 by mass) (available from Evonik Industries AG)

(7) Organic Peroxide Masterbatch (G)

Organic peroxide masterbatch containing 8% by mass of bis(tert-butylperoxyisopropyl)benzene and 92% by mass of polypropylene (8) Pigment Masterbatch (H)

Carbon black contained (content: 51%)

The physical properties were measured in accordance with the following test methods.

(1) Melt Flow Rate (MFR, Unit: G/10 Min)

The MFR was measured under a load of 2.16 kg in accordance with the method specified in JIS-K-6758. The MFR of the component (A) and the polypropylene resin composition was measured at a temperature of 230° C., and the MFR of the components (B-1) and (B-2) was measured at a temperature of 190° C. (JIS-K-7210).

(2) The Limiting Viscosity Number (Unit: DL/g) Refers to a Value Measured at a Temperature of 135° C. Using Tetralin as a Solvent in Accordance with the Following Method.

The reduced viscosity at three concentrations, 0.1 g/dL, 0.2 g/dL, and 0.5 g/dL, is measured by using an Ubbelohde viscometer. The limiting viscosity number is determined by plotting reduced viscosity against concentration and extrapolating the concentration to zero. The method for calculating the limiting viscosity number by extrapolation is described in, for example, "Polymer Solution, Polymer Experiment 11" (published by Kyoritsu Shuppan Co., Ltd., 1982), page 491.

(3) Proportion of Propylene Homopolymer Component and Propylene-Ethylene Random Copolymer Component, and Calculation and Measurement of Limiting Viscosity Numbers ([η]I, [η]II).

The limiting viscosity number ([η]II) of the propylene-ethylene random copolymer component synthesized in the following polymerization step was calculated in accordance with the following formula from the limiting viscosity number ([η]I) of the propylene homopolymer component produced in the preceding polymerization step, the limiting viscosity number ([η]Total) of the final polymer (a product composed of the propylene homopolymer component and the propylene-ethylene random copolymer component) after the following polymerization step measured by the method described above, and the content (weight ratio) of the propylene-ethylene random copolymer component contained in the final polymer.

$$[\eta]\ II=([\eta]\ \text{Total}-[\eta]\ I\times XI)/XII$$

- [η]Total: the limiting viscosity number (dl/g) of the final polymer after the following polymerization step
- [η]I: the limiting viscosity number (dl/g) of a polymer powder taken from a polymerization tank after the preceding polymerization step
- XI: the weight ratio of the component synthesized in the preceding step
- XII: the weight ratio of the component synthesized in the following step Here, XI and XII can be obtained from the mass balance in the polymerization.

XII may be calculated from the following formula by measuring the heat of fusion of the polymer I and the heat of fusion of the heterophasic propylene polymer material.

$$XII=1-(\Delta Hf)T/(\Delta Hf)P$$

- (ΔHf)T: the heat of fusion (J/g) of the heterophasic propylene polymer material
- (ΔHf)P: the heat of fusion (J/g) of the polymer I (4) Ethylene Content in Propylene-Ethylene Random Copolymer The ethylene content ((C2)II) of the ethylene-α-olefin copolymer in the propylene polymer composition was calculated by using the following formula from the ethylene content ((C2')Total) of the entire propylene polymer composition measured by infrared absorption spectroscopy.

$$(C2')II=(C2')Total/XII$$

- (C2')Total: the ethylene content (i by mass) of the entire propylene polymer composition
- (C2')II: the ethylene content (0 by mass) of the ethylene-α-olefin copolymer (5) Charpy Impact Test (Unit: kJ/m$^2$)

A test piece of type A (mold cavity shape: ISO mold) was prepared by injection molding at a molding temperature of 197° C. and a mold cooling temperature of 38° C. using an injection molding machine M70 available from Meiki Co., Ltd (clamping force 70 tons, cylinder diameter 32 mm). The test piece, 10 mm (wide)×80 mm (long)×4 mm (thick), was notched and subjected to measurement at a temperature of 23° C. in accordance with JIS K7111.

(6) Scratch Resistance Abrasion (Unit: %)

A rectangular parallelepiped test piece having a length of 400 mm, a width of 100 mm, and a thickness of 3 mm (having a surface (textured surface), 400 mm×100 mm, with a texturing pattern and a back mirror surface (mirror surface), 400 mm×100 mm) was prepared by injection molding at a molding temperature of 220° C. and a mold cooling temperature of 50° C. using an injection molding machine SE180D model available from Sumitomo Heavy Industries, Ltd.

The textured surface of the test piece was rubbed with a friction block (shape: R5, 12 mm wide) 105 times at a load of 29 N and a speed of 28 cm/sec using a scratch tester Scratch 4 available from Surface Machine System. The gloss was measured, and the rate of change from the gloss before scratching was determined. The smaller the rate of change, the better the scratch resistance. The gloss was evaluated by measuring the glossiness (incident angle 60 degrees, specular gloss value) was measured by using Micro-gloss available from BYK-Gardner.

(7) Scratch Resistance Plane Scratch (Visual Observation)

A rectangular parallelepiped test piece having a length of 400 mm, a width of 100 mm, and a thickness of 3 mm (having a surface (textured surface), 400 mm×100 mm, with a texturing pattern and a back mirror surface (mirror surface), 400 mm×100 mm) was prepared by injection molding at a molding temperature of 220° C. and a mold cooling temperature of 50° C. using an injection molding machine SE180D model available from Sumitomo Heavy Industries, Ltd. The textured surface of the test piece was scratched with the cutting blade of a plane at a load of 100 g using a Taber scratch tester available from Toyo Seiki Kogyo Co., Ltd, and the scratches were evaluated by visual observation. Whitened scratches were rated x, and non-whitened scratches were rated ○. The less whitened, the better the scratch resistance.

(8) Crystallization Time (Unit: Sec)

Measurement was performed by using "Diamond DSC" (differential scanning calorimeter) available from PerkinElmer Co., Ltd. Specifically, a test sample was prepared by compressing pellets of the polypropylene resin composition into a film (100μ) using a compression molding machine. About 10 mg of the prepared sample was set in the DSC, and the temperature was once raised to 220° C. The sample was left to stand at 220° C. for 5 minutes to completely dissolve the sample. Subsequently, the sample was rapidly cooled to 125° C. at a rate of 300° C./min and maintained at that temperature until the time corresponding to the end of the calorimetric curve. The crystallization time was determined as the time (seconds) required to reach the maximum value (peak top) of the obtained calorimetric curve. It is noted that the shorter the required time, the shorter the time until crystallization. The shorter the crystallization time, the shorter the cooling time during molding and the better the moldability.

(8) Warpage (Unit: Mm)

A disc test piece having a diameter of 200 mm and a thickness of 1 mm was prepared by injection molding at a molding temperature of 220° C. and a mold cooling temperature of 40° C. using an injection molding machine SE130DU model available from Sumitomo Heavy Industries, Ltd. The end portions of the test piece were held without touching the ground, and a difference in height between the lowest position and the highest position of the end portions of the test piece was measured. The smaller the difference in height, the smaller the warpage, which is better.

(9) Melting Point (Unit: ° C.)

Measurement was performed by using "Diamond DSC" (differential scanning calorimeter) available from PerkinElmer Co., Ltd. Specifically, a test sample was prepared by compressing pellets of the polypropylene resin composition into a film (100μ) using a compression molding machine. About 10 mg of the prepared sample was set in the DSC, and the temperature was once raised to 230° C. The sample was left to stand at 230° C. for 5 minutes to completely dissolve the sample. Subsequently, the sample was cooled to 40° C. at a rate of 5° C./min and left to stand at 40° C. for 5 minutes. The sample was then heated to 230° C. at a rate of 5° C./min, and the temperature at the lowest value of the calorimetric curve during heating was determined as a melting point.

Example 1

[Production of Polypropylene Resin Composition]

After 41 parts by mass of the component (A-1), 21 parts by mass of the component (B-1-1), 15 parts by mass of the component (B-2-1), 21 parts by mass of the component (C), 2 parts by mass of the component (D), 0.05 parts by mass of the component (E), 0.4 parts by mass of the component (F), 0.35 parts by mass of the component (G), and 3 parts by mass of the component (H) were uniformly premixed, the resulting mixture was melt-kneaded in a twin-screw kneading extruder at an extrusion rate of 50 kg/hr, 230° C., and a screw rotation speed of 200 rpm to produce a polypropylene resin composition. The physical properties of the produced propylene resin composition are described below in Table 1.

Examples 2 to 5 and Comparative Examples 1 to 2

The polypropylene resin compositions were produced by changing the amounts of the components described in Table 1.

The physical properties of the produced polypropylene resin compositions are described below in Table 1.

TABLE 1

| | Unit | Example 1 | Example 2 | Example 3 | Example 4 | Example 5 | Example 6 | Comparative Example 1 | Comparative Example 2 |
|---|---|---|---|---|---|---|---|---|---|
| A-1 | parts by mass | 41 | 46 | 27 | 37 | 34 | 37 | | 39 |
| A-2 | parts by mass | | | | | | | 60 | |
| B-1-1 | parts by mass | 21 | 17 | 21 | 21 | | 21 | | 21 |
| B-1-2 | parts by mass | | | | | 26 | | | |
| B-2-1 | parts by mass | 15 | 15 | 15 | 15 | 10 | 15 | 15 | 15 |
| B-2-2 | parts by mass | | | | | | | 5 | |
| C | parts by mass | 21 | 21 | 35 | 25 | 25 | 25 | 15 | 25 |
| D | parts by mass | 2 | 1 | 2 | 2 | 5 | 2 | 5 | |
| E | parts by mass | 0.05 | 0.05 | 0.05 | | | | | |
| F-1 | parts by mass | 0.4 | 0.4 | 0.4 | 0.4 | 0.4 | | 0.4 | 0.4 |
| F-2 | parts by mass | | | | | | 1.5 | | |
| G | parts by mass | 0.35 | 0.24 | 0.45 | 0.4 | | 0.4 | | |
| H | parts by mass | 3 | 3 | 3 | 3 | 3 | 3 | 3 | 3 |
| MFR | g/10 min | 31 | 34 | 21 | 28 | 18 | 27 | 25 | 22 |
| Charpy impact strength | kJ/m$^2$ | 33 | 27 | 40 | 35 | 40 | 35 | 14 | 10 |
| Scratch resistance abrasion | % | 127 | 122 | | | 114 | | | 119 |
| Scratch resistance plane scratch | | ○ | ○ | ○ | ○ | ○ | ○ | ○ | ○ |
| Warpage | mm | 9 | 9 | 8 | 6 | | | 23 | 7 |
| Crystallization time | sec | 8 | 8 | 13 | 24 | 17 | 21 | 20 | 22 |

Table 1 indicates that the polypropylene resin compositions of Comparative Examples 1 to 2 have poor (low) Charpy impact strength. Table 1 further indicates that the polypropylene resin composition of Comparative Example 1 shows poor warpage (high warpage value).

INDUSTRIAL APPLICABILITY

The polypropylene resin composition of the present invention has good properties so as to, for example, provide a molded body with high impact strength and less warpage while maintaining high scratch resistance. The polypropylene resin composition of the present invention is thus particularly preferably used as an injection molding material, and preferably used in applications, such as various automotive interior and exterior parts including instrument panels, glove boxes, trims, housings, pillars, bumpers, fenders, and back doors, various parts for home appliances, various household equipment parts, various industrial parts, and various building material parts. The polypropylene resin composition of the present invention has wide industrial applicability in various industrial fields, such as transportation machinery industry, electrical and electronics industry, and building and construction industry.

The invention claimed is:

1. A polypropylene resin composition comprising:

from 20 to 50 parts by weight of a heterophasic propylene polymer material (A) having a melt flow rate of from 70 g/10 min to 300 g/10 min as determined at 230° C. under a load of 2.16 kgf in accordance with JIS-K-6758;

from 17 to 40 parts by weight of an ethylene-α-olefin copolymer (B-1) having a melt flow rate of from 2 g/10 min to 100 g/10 min as determined at 190° C. under a load of 2.16 kgf in accordance with JIS-K-7210;

from 15 to 20 parts by weight of an ethylene-α-olefin copolymer (B-2) having a melt flow rate of 1 g/10 min or less as determined at 190° C. under a load of 2.16 kgf in accordance with JIS-K-7210;

from 20 to 40 parts by weight of a glass fiber (C); and from 0.1 to 5 parts by weight of an acid-modified polyolefin (D) based on 100 parts (A), (B-1), (B-2), (C), and (D).

2. The polypropylene resin composition according to claim 1, further comprising a lubricant (F).

3. The polypropylene resin composition according to claim 2, wherein the lubricant (F) comprises a fatty acid amide (F-1).

4. The polypropylene resin composition according to claim 3, wherein a content of the fatty acid amide (F-1) is from 0.1 to 1.0 parts by weight based on 100 parts of (A), (B-1), (B-2), (C), and (D).

5. The polypropylene resin composition according to claim 2, wherein the lubricant (F) comprises a silicone lubricant (F-2).

6. The polypropylene resin composition according to claim 5, wherein a content of the silicone lubricant (F-2) is from 0.5 to 3.0 parts by weight based on 100 parts of (A), (B-1), (B-2), (C), and (D).

7. The polypropylene resin composition according to claim 1, further comprising a nucleating agent (E).

8. The polypropylene resin composition according to claim 7, wherein a content of the nucleating agent (E) is from 0.01 to 0.5 parts by weight based on 100 parts by weight of (A), (B-1), (B-2), (C), and (D).

9. A molded body comprising the polypropylene resin composition according to claim 1.

10. The polypropylene resin composition according to claim 1, wherein a melt flow rate of the acid-modified polyolefin (D) is from 5 to 400 g/10 min as determined at 230° C. under a load of 2.16 kgf in accordance with JIS-K-7210.

11. The polypropylene resin composition according to claim 1, comprising from 21 to 40 parts by weight of the ethylene-α-olefin copolymer (B-1) based on 100 parts (A), (B-1), (B-2), (C), and (D).

* * * * *